G. E. JACKSON.
BALING PRESS.
APPLICATION FILED SEPT. 18, 1912.
1,076,288.
Patented Oct. 21, 1913.
8 SHEETS—SHEET 8.
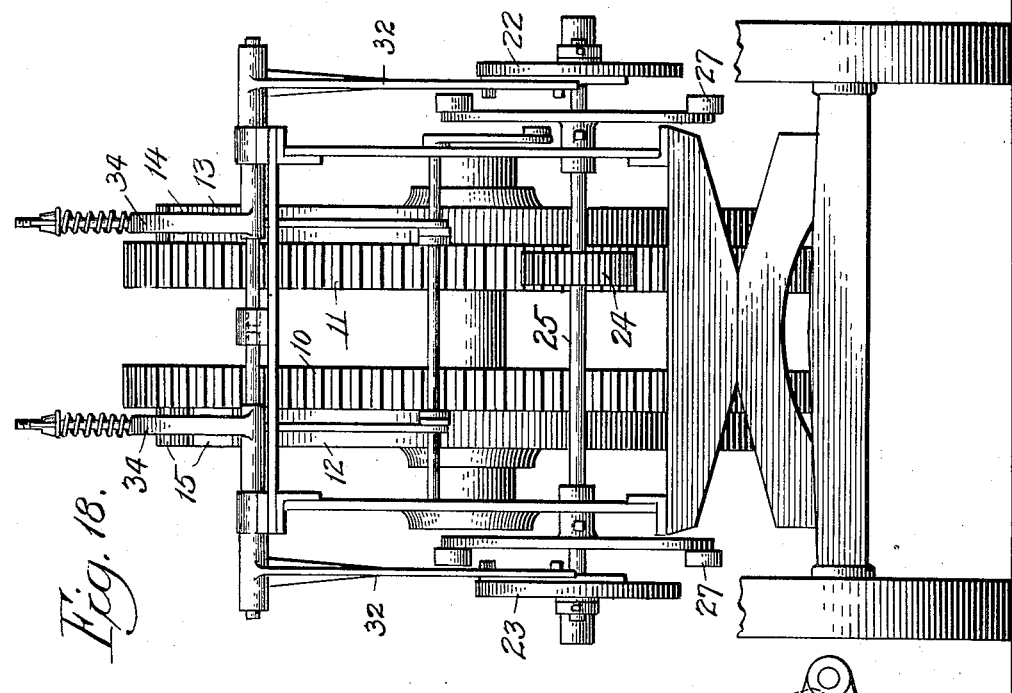
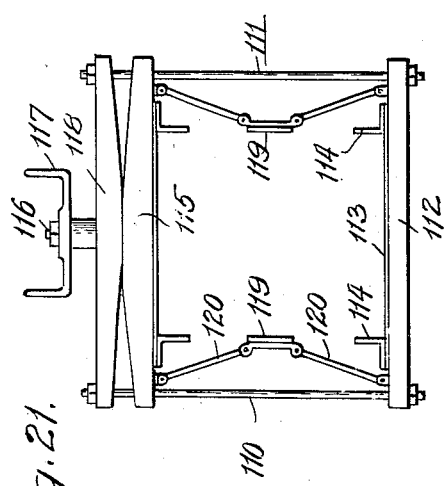
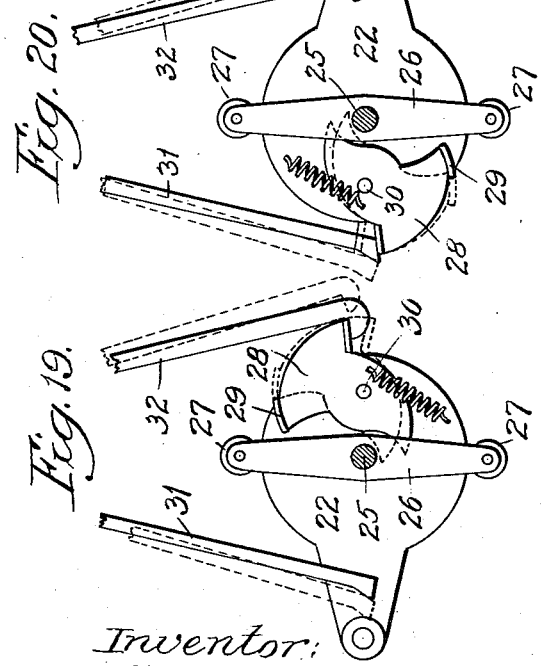
Witnesses:
John Enders
P. W. Baumann.
Inventor:
George E. Jackson,
by Wallace R. Lane
Atty.

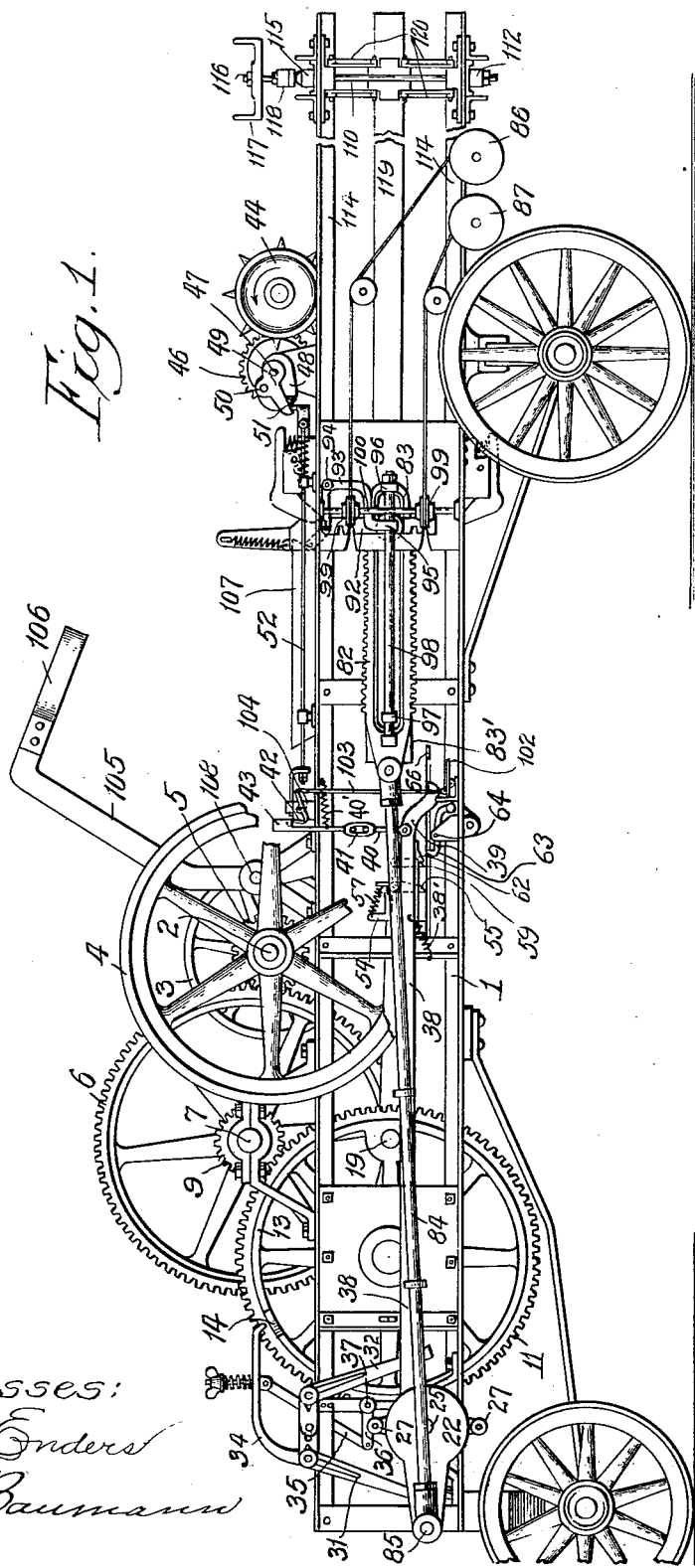

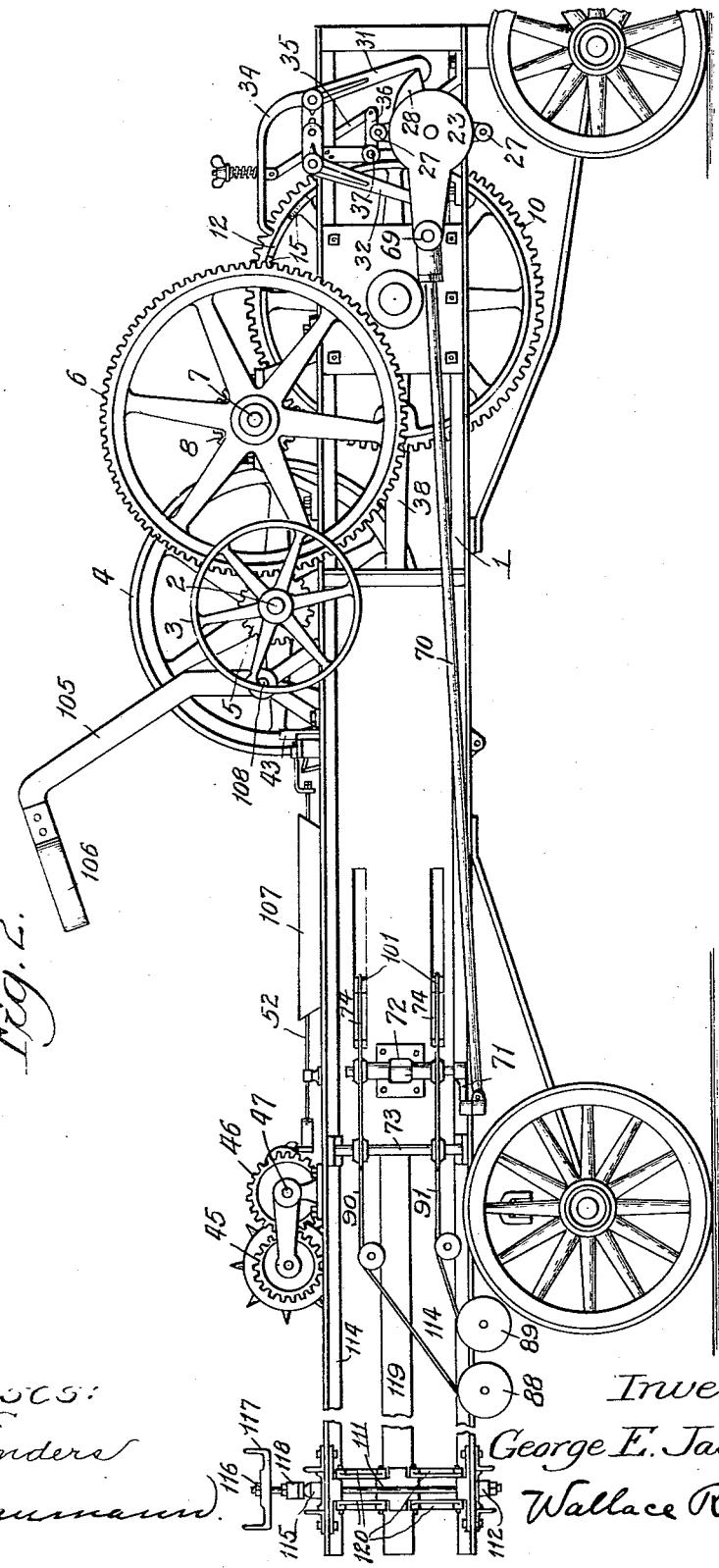

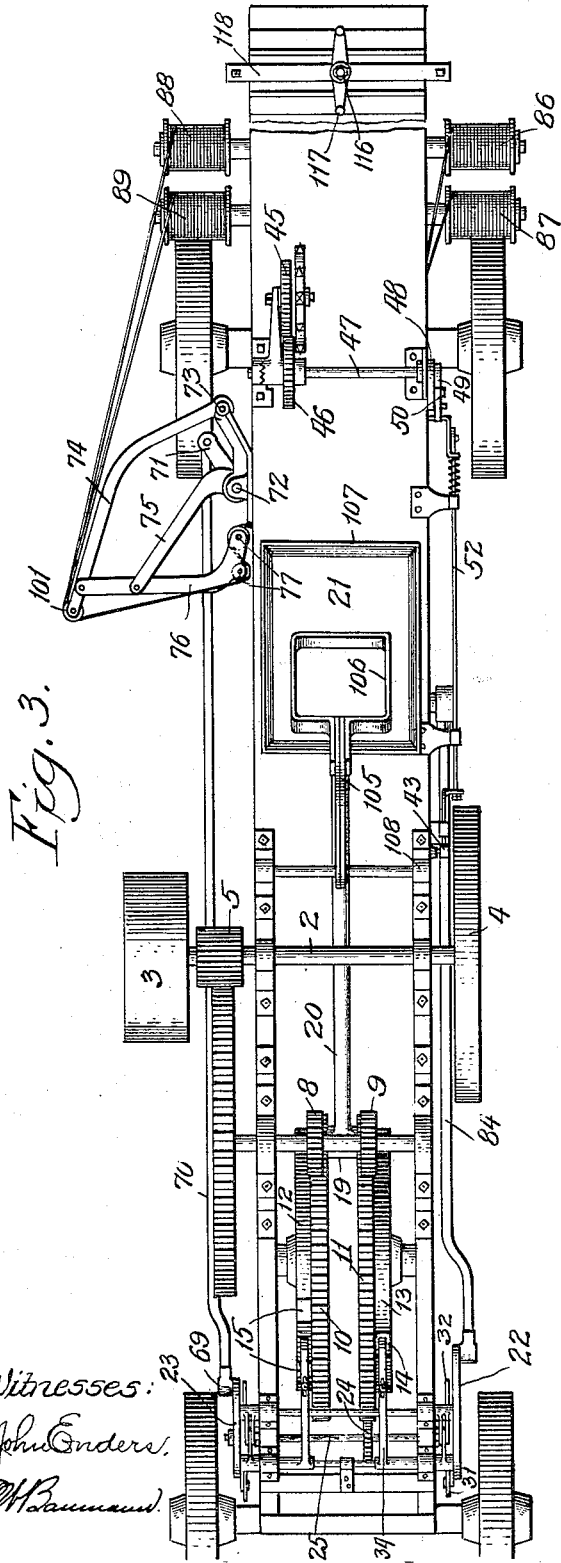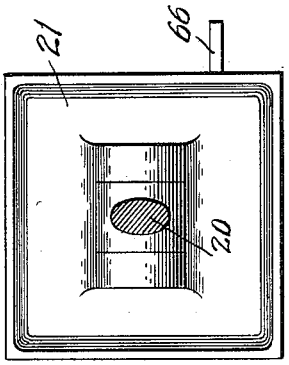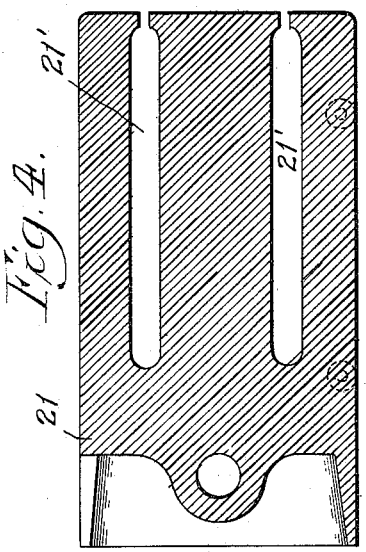

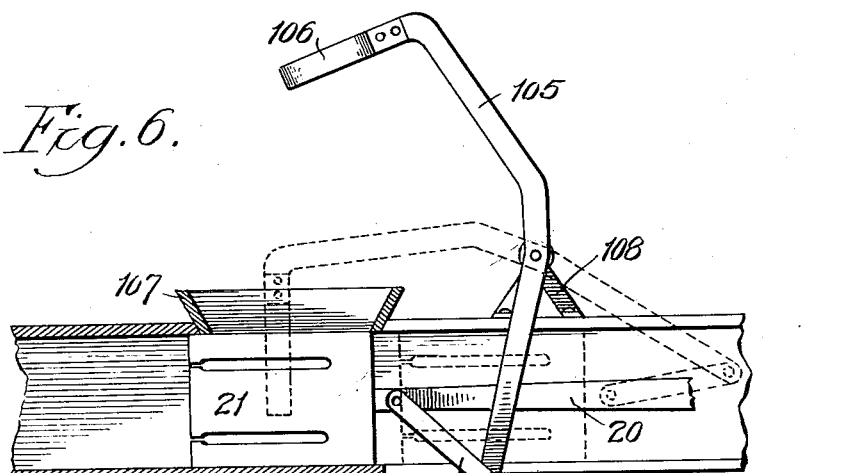
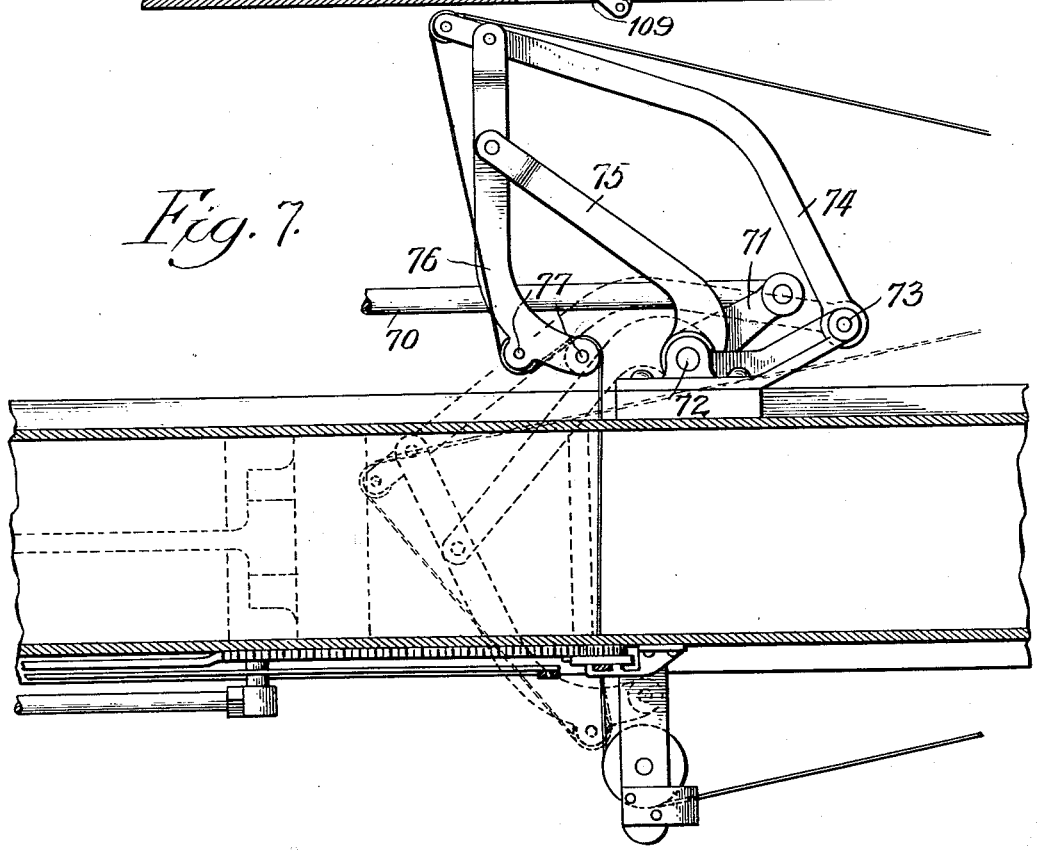

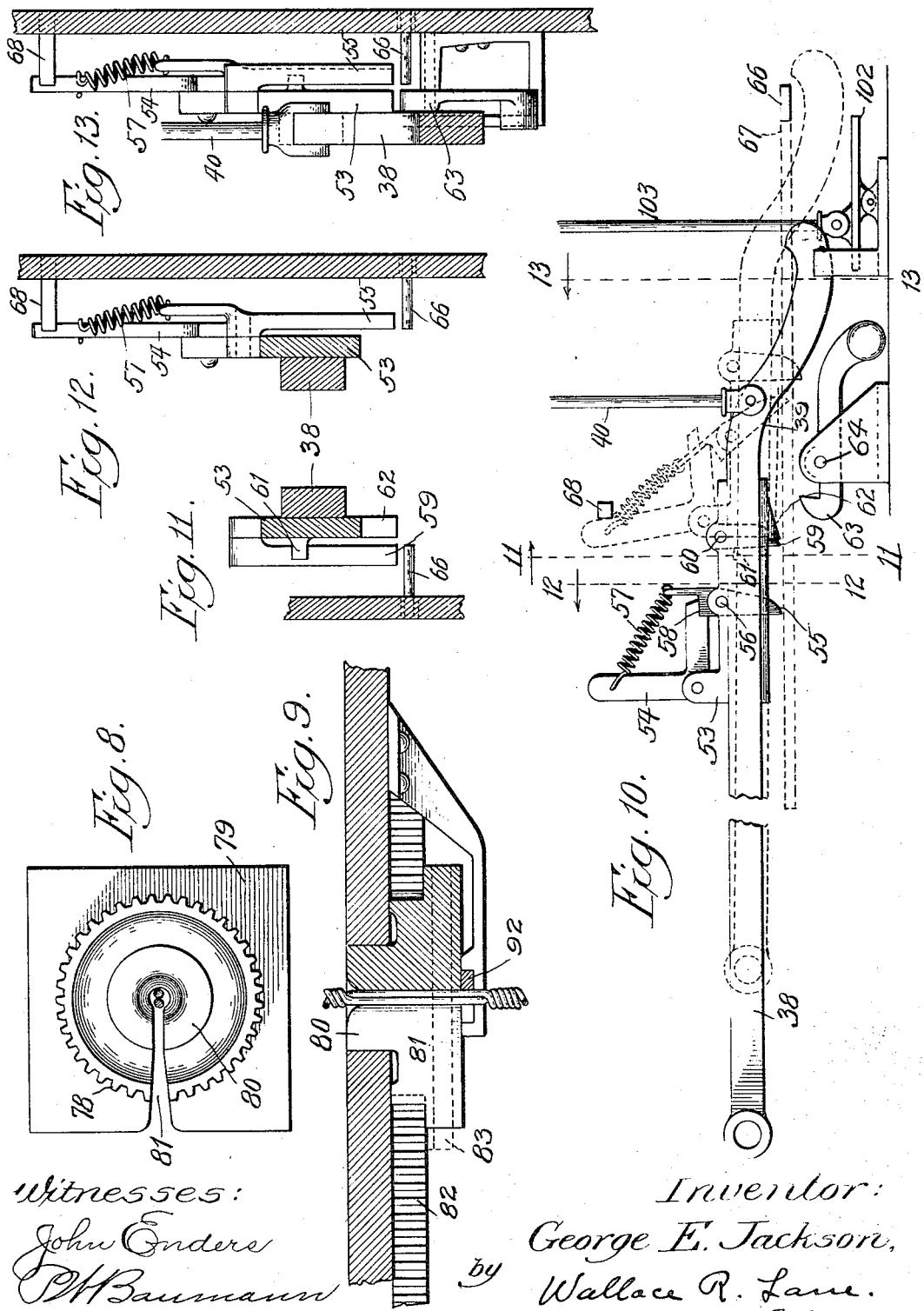

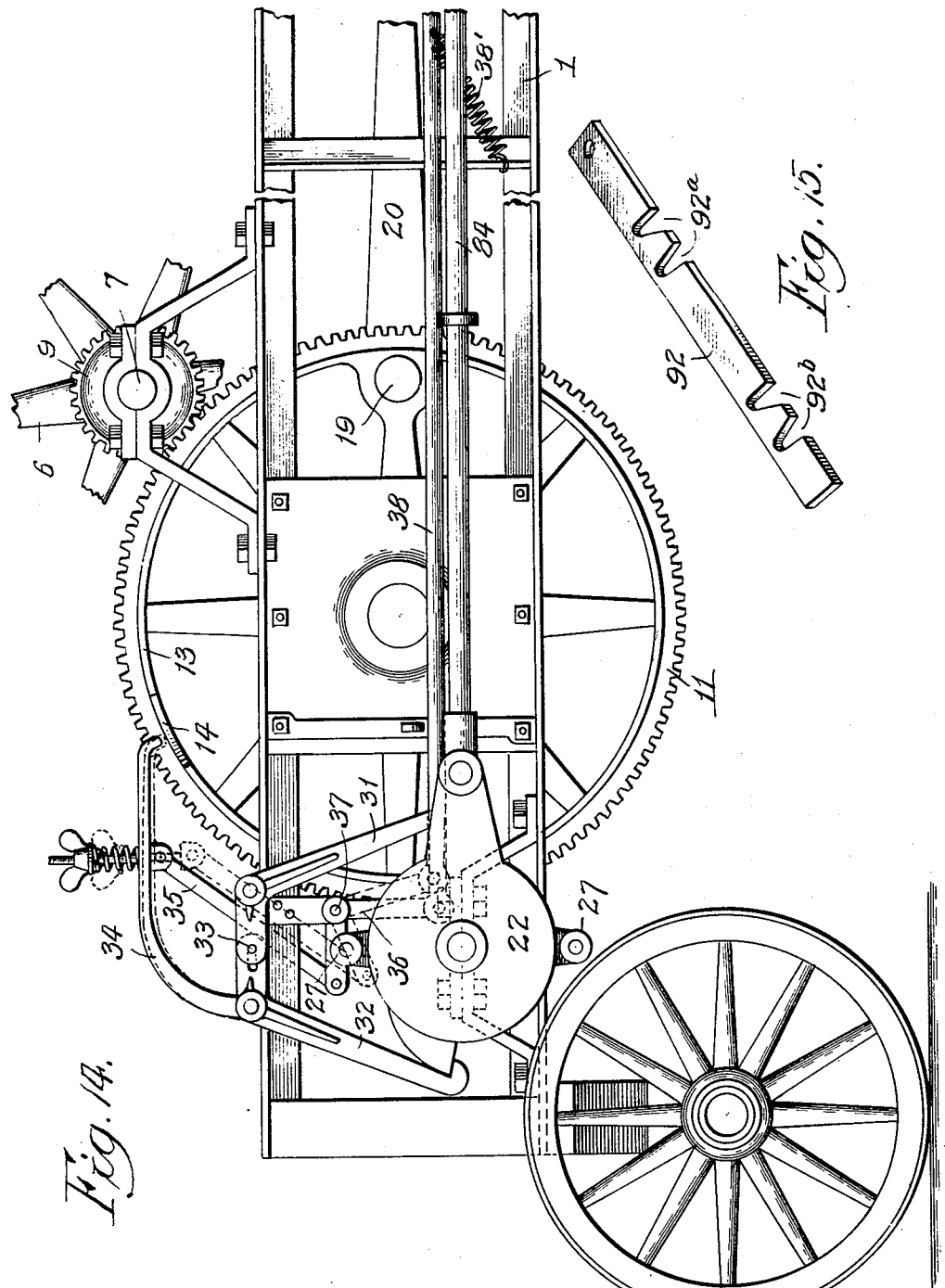

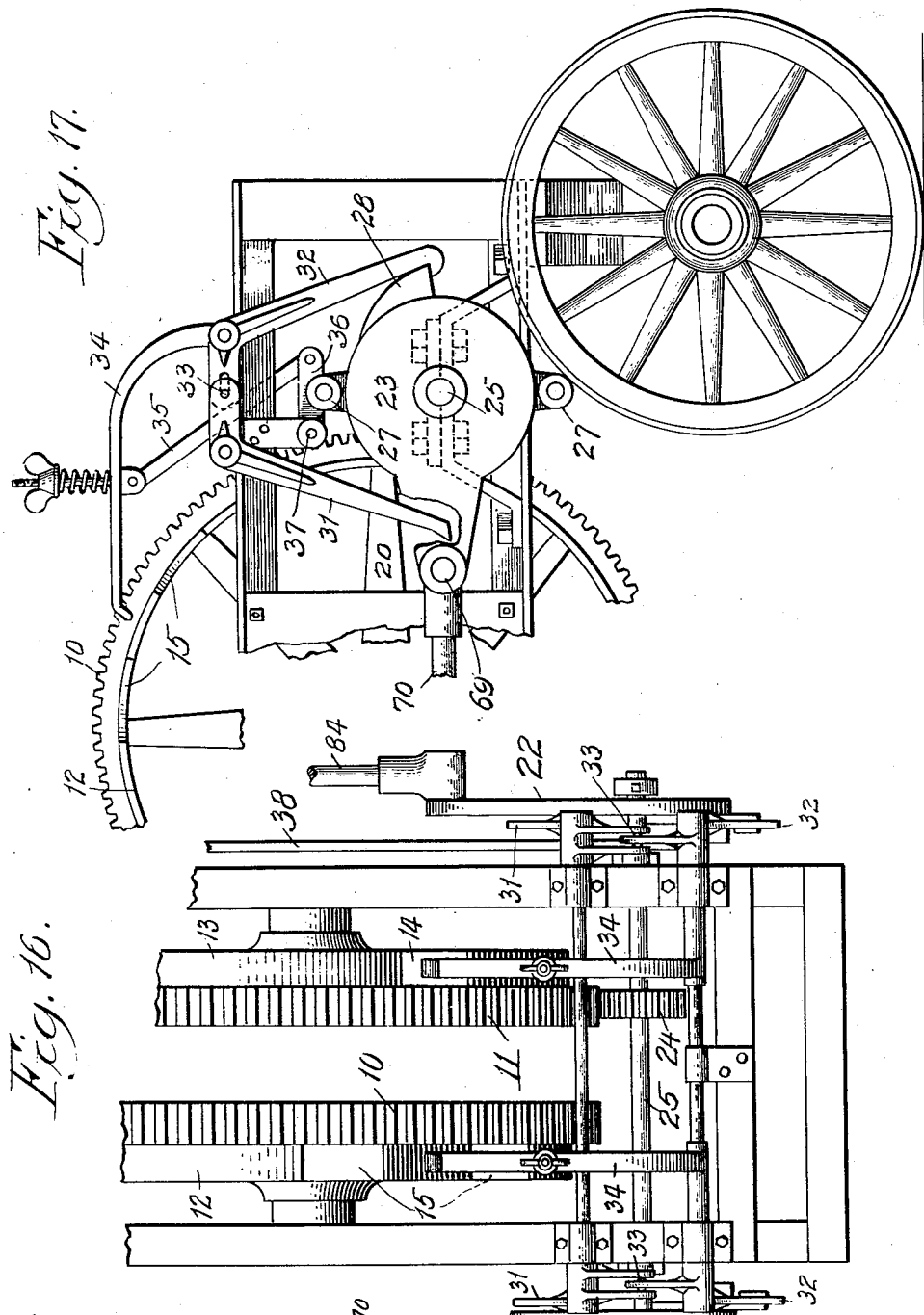

UNITED STATES PATENT OFFICE.

GEORGE E. JACKSON, OF NEWTON, IOWA.

BALING-PRESS.

1,076,288.

Specification of Letters Patent. Patented Oct. 21, 1913.

Application filed September 18, 1912. Serial No. 720,956.

*To all whom it may concern:*

Be it known that I, GEORGE E. JACKSON, a citizen of the United States, residing at Newton, county of Jasper, and State of Iowa, have invented certain new and useful Improvements in Baling-Presses, of which the following is a specification.

It is the object of the present invention to provide a baling press in which the several operations are in a large measure automatic, and in which the succession of operations can be carried out continuously and at high speed.

More particularly the invention relates to a press having a reciprocating power driven plunger working in conjunction with a feeder for delivering hay or other material into the chamber, there to be compressed by the plunger. The machine also includes wire-carrying needles which can pass through suitable slots in the plunger while it is at the end of its compression stroke, and which carry wire for binding the compressed hay. In the preferred embodiment of the present invention clutch mechanism of improved construction is utilized for controlling the movement of the wire-carrying needles and the needles themselves are of special shape and movable with a sufficient motion to insure most advantageous feeding of wire and the least possible danger of wire breakage. The preferred embodiment also includes an improved wire-cutting mechanism and also control mechanism whereby the successive operations may be regulated and be made to follow one another in the proper sequence and at the proper time intervals automatically regulating the size of the bales and insuring tight and secure binding with the wires.

In the drawings which accompany and form a part of this specification—Figure 1 is a side elevation of the complete press. Fig. 2 is an elevation of the reverse side. Fig. 3 is a plan view. Fig. 4 is an enlarged cross-sectional view of the plunger. Fig. 5 shows the rear end of the plunger with its cross-head connection. Fig. 6 is a detail showing the packing lever and its link connections with the packing plunger. Fig. 7 is a detail plan view of the needles and wire-feeding mechanism or arms. Fig. 8 is a side elevation of one of the wire twisting disks. Fig. 9 is a cross sectional view of the disk of Fig. 8, showing it in its operative relation with its driving rack and with its wire cutting knife. Fig. 10 is a detail view showing the automatic mechanism operative by movement of the plunger to throw the clutches or latch mechanism into and out of operation as may be required to set into motion the wire-carrying needles and the twisting mechanism after each bale has reached a predetermined size. Fig. 11 is a cross-sectional view on the line 11—11 of Fig. 10. Fig. 12 is a cross section on the line 12—12, Fig. 10. Fig. 13 is a cross section on the line 13—13, Fig. 10. Fig. 14 is a fragmentary side elevation showing the part of the clutch mechanism which is used to regulate the movement of the twisters. Fig. 15 shows the knife used for cutting the binding wire after each bale has been completed. Fig. 16 is a plan view of the mechanism shown in Fig. 14. Fig. 17 is a partial side elevation showing the clutch or latch mechanism used for controlling the wire-feeding mechanism. Fig. 18 is a front view of the structures illustrated in Figs. 14, 16 and 17. Figs. 19 and 20 show the structure of the clutch or latch mechanism used to govern the movements of the wire-feeding mechanism and of the wire twisting mechanism, changes in the position of certain of the parts being indicated by dotted lines. Fig. 21 is an end elevation of the members used at the tail end of the machine to regulate the cross section of the outlet and thereby to regulate the degree of compression produced in the machine.

In the construction shown, the supporting frame work 1 of the press is mounted on wheels for ease in transportation. The main power shaft 2 mounted transversely to the frame work is provided with a power pulley 3 for connection to a suitable source of energy, such as a gas engine, and is also provided with a heavy fly-wheel 4. The shaft 2 carries a pinion 5 meshing with a large gear 6 fixed upon a counter-shaft 7 arranged transverse to the machine frame and carried in suitable bracket bearings. The shaft 7 also carries pinions 8 and 9 which mesh permanently with large gear wheels 10 and 11 mounted to turn in unison and serving to drive the main plunger while also acting as a part of the tripping mechanism for the wire operating mechanism and the twisters. The latter function is attained through the presence on these wheels of projecting side flanges numbered respectively 12 and 13, these flanges serving as cam surfaces and having openings or cut away portions suitably disposed to bring the wiring mechanism and the twisting mechanism into play at the proper time with respect to the movement of the plunger and completion of the bale. On the twister side of the machine the flange or cam face 13 has a single opening 14 of about the angular width and relative position indicated in Fig. 14, but on the needle side of the machine, as shown in Figs. 2 and 17, there are two cut away portions 15 suitably spaced to time the action of the needle to the action of the plunger and of the twisters.

The large gears 10 and 11 are connected together near their periphery by a cross-pin 19, to which is pivotally secured the plunger rod 20, the other end of which is connected to the plunger 21. When the gears 10 and 11 are rotated through the action of the belt connected driving engine, the plunger 21 will be reciprocated back and forth in the baling chamber and can be used to compress within that chamber the hay or other material fed in at the hopper on the top of the machine immediately above the path of the forwardly-moving plunger.

The clutch mechanism mounted at the rear of the main frame 1 and used for controlling the action of the wiring mechanism and of the twisters comprises two latch mechanisms, one on either side of the main frame and both actuated from a common drive shaft, one of the mechanisms being arranged for operative connection with the wire carrying needles and the other being arranged to operate the twisters after the needles have been swung around through openings in the plunger to completely inclose with wire the bale just completed.

The clutch mechanism on the left-hand side of the machine includes a crank disk 22 for operating the twister rod, and the clutch mechanism on the right hand side of the machine includes a crank disk 23 for operating the needle rod. These clutch mechanisms are essentially the same in construction, and the description of but one will suffice. Meshing with the large gear 11 is a small gear 24 mounted on a counter-shaft 25 which rotates continuously and which serves as a power shaft which can be periodically connected up through clutches to either the needle mechanism or the twister mechanism, the connection to this continuously rotating shaft 25 being maintained only just long enough to produce in each instance a one-half revolution of the crank disks 22 and 23, it being understood that these disks are operated in succession, disk 23 first throwing the needles through the plunger to complete the loop of wire about the bale, then disk 22 moving to twist the wire, and then disk 23 making another half revolution to withdraw the needles and thread the machine for another bale. The details of one of the clutch mechanisms is shown in Figs. 19 and 20. Mounted rigidly on the continuously rotating shaft 25 is a cross arm 26 bearing a roller 27 at either end, these rollers being spaced away from the inner face of the crank disk 22, but with a latch 28 so shaped that it can serve to establish driving connection between the rollers and the disk, thereby serving to connect the disk with the continuously rotating shaft 25 for such time as the latch 28 may remain in its extended or operative position with respect to the continuously moving rollers 27. The latch 28 has a lateral projecting shoulder 29 which serves as the striking face for the rollers 27 when the latch is in its outermost position; it being understood that the latch is pivotally mounted at 30 and is provided with a suitable spring urging the lug 29 outward into the path of the moving rollers 27. The inner end of the latch is positioned to serve as a stop to limit the outward swing of the latch by striking against the shaft 25, as indicated in dotted lines in Figs. 19 and 20. A pair of vertically disposed arms 31 and 32 arranged on either side of the latch mechanism serve to control the position of the latch and thereby serve to govern the connection between the rollers 27 of the continuously swinging arm 26 and the cam disk 22. Arm 32 has a hook at its lower end for engagement with the front face of the latch 28 to hold the latch inward with its lug 29 out of the path of the rollers 27 when no movement of the crank disk 22 is desired, said arm 32 being movable outward with a swinging motion to release the latch and allow it to swing outward as shown in dotted lines, Fig. 19, thereby putting the lug 29 in the path of a roller 27. The lower end of the arm 31 serves a similar function after the crank disk has swung around into the position shown in Fig. 20.

Arms 31 and 32 have horizontal extensions pinned together with a sliding connecting pin at 33, so that they move in unison. A projecting arm 34 rigidly connected with one of the arms bears on the cam face 13 of the main wheel 11, and, by dropping through the opening 14 in the cam face, serves to swing the arms 31 and 32 outward in unison. As a means for pulling the extension 34 down into contact with the cam face 13, there is provided a link 35 yieldingly connected to the extension 34 and pivotally connected with one arm of a bell crank 36 movable about an axis 37 and pivotally connected to a control rod 38 which extends along the side of the press, as shown in Figs. 1 and 14. This rod is curved downward at 39 and carries an upwardly extending link 40 having an adjusting turn buckle 41. The upper end of this link rests on a lug 42 carried on top of the frame work of the machine. A lateral extension 43 on the supporting link engages the lug 42 under certain conditions, but can be pushed off to drop the front end of the control rod 38 when desired. The suspended position of the parts is shown in Fig. 1.
The coiled spring 38' secured to the framework of the machine and to the control rod 38, as shown in Fig. 14, tends to hold the rod in its rearward position, which is the position of the rod shown in Figs. 1 and 10.
The mechanism which automatically releases the supporting link 40 from the lug 42 and causes the operating rod 38 to drop is governed by other mechanism mounted on the top of the machine frame. The spur wheel 44 is mounted above the frame in the path of movement of the hay which is being pressed in the baling chamber, the direction of movement of this spur wheel being as indicated by the arrow in Fig. 1.
The movement of the spur wheel is transmitted through gears 45 and 46 (see Fig. 3) to the shaft 47. The cam 48 is fixed upon shaft 47, this cam being of the shape shown in Fig. 1. The weighted lever 49 is pivoted on the cam at 50. As the spur gear 44 is actuated by the movement of the material through the baling chamber, the cam will be rotated in a clock-wise direction until the lug 51 on said cam strikes the lever 49 and carries the same along with it, continuing that motion until the lever strikes the end of a horizontal spring pressed push rod 52, forcing it toward the left, as viewed in Fig. 1, and pushing the supporting link 43 off the lug 42. This causes the link 40 and its supported operating rod 38 to drop until the outer end of the rod drops down into its lower position. Let us now turn to Fig. 10 in which the operating rod 38 is shown in full lines in its rearward suspended position and in dotted lines in its forward lower portion.

A plate 53 is carried by the rod 38 just at the rear of the bend 39. The bell-crank lever 54 is pivoted to the plate 53. A dog 55 is pivoted to the plate at 56 and is normally held in a vertical position by the spring 57, connected at one end to the bell crank lever 54 and at the other end to an extension on the dog 55. This spring forces the bell-crank lever and the dog into engagement with each other at the point 58, as clearly illustrated in Fig. 10. A second dog 59 is pivoted to the plate 53 at 60 and is free to swing forwardly, that is to the right, as viewed in Fig. 10. A lug 61 carried by the plate 53 prevents the dog 59 from swinging rearwardly. The plate 53 has a downwardly extending lug 62. A pawl 63 is pivoted at 64 to the frame-work of the press with its hooked end urged upwardly by the weight at its other end. As seen in Fig. 5, the plunger 21 is provided at one side with a transverse lug 66. This lug is indicated in full lines in Fig. 10, the plunger being omitted so as not to obscure the figure. The lug 66 is accommodated in a slot 67 in the side of the frame-work, this slot being indicated in dotted lines in Fig. 10, no part of the frame-work being shown.
When the operating rod 38 is in its normal or elevated position, the lower ends of the dogs 55 and 59, and the projection 62 are out of the path of movement of the lug 66. Now let it be assumed that the supporting link 40 has been released from its supporting lug 42 and that the operating rod 38 is therefore in its lower position. This position of the rod is its rearward lower position. This distinction is made because, as will presently appear, there is a forward lower position which the rod will assume. If, when the operating rod 38 is dropped to its rearward lower position, the next movement of the plunger is the return or rearward stroke, the lug 66 will strike the projection 62 and the dog 59 and will slightly raise the forward end of the rod. This movement, however, is insufficient in extent to raise the link 40 into engagement with the supporting lug 42, and, as soon as the lug 66 has passed the projection 62 and the dog 59, the operating rod 38 will fall back to its lower position. Further movement of the lug 66 brings it in contact with the rounded end of the dog 55 which yields to let the lug pass by.

When the plunger moves forwardly while the operating rod 38 is in its rearward lower position, the lug 66 first encounters the dog
55. As this dog does not swing forwardly, the operating rod 38 will be carried along by the plunger until the bell-crank lever 54 strikes the stationary lug 68 carried by the frame-work. When this happens, the horizontal arm of the bell-crank 54 is tripped up, out of engagement with the dog 55, and the latter is swung to the position indicated in dotted lines, Fig. 10. The projection 62 on the plate 53 is then in engagement with the pawl 63, and the operating rod is thus locked against rearward movement. The plunger, however, is free to continue its compression stroke. Fig. 10 shows in dotted lines this forward lower position of the operating rod. When the operating rod 38 is thus moved forwardly by the plunger, it serves to throw into action the clutch mechanisms connected with the cam disks 22 and 23 to the extent of swinging the bell cranks 35 about their axis 36 and so pulling downward on the links 35 and bringing the extending arms 34 into yielding engagement with the cam faces 12 and 13 on the large gear wheels 10 and 11. Then, as soon as either of these extending arms 34 encounters an opening in its cam face, it drops through, thereby swinging the latch arms 31 and 32 outward, which, by releasing the latch, enables it to establish driving connection between the continuously moving rollers 27 and the adjacent crank disk. The cam openings are so placed with respect to one another that, first, the needle operating clutch is thrown in to swing the needles forward to inclose the bale with wire, and then the twister crank disk 22 is turned to twist the wire and to cut it, and finally the needle disk is again rotated through a half revolution to withdraw the needles to their initial or idle position. It will thus be seen that the plunger automatically throws into operation the needle mechanism and the twister mechanism when the bale under formation has reached a predetermined size. The construction and operation of the wire feeding mechanism and of the wire twisting mechanism will now be described.

The needle operating cam disk 23 carries a crank pin 69 on which is pivoted the connecting rod 70 as shown in Fig. 2. At its other end, the connecting rod 70 is pivotally connected with a crank arm 71 fixed upon the vertical shaft 72. This connection is best shown in Fig. 7 which illustrates the wire feeding needles in detail.

In the particular embodiment illustrated in the drawings, two wire feeding arms or needles are shown, but it is obvious that the number may be varied to suit circumstances, two wires being sufficient for ordinary bales. To the vertical shaft 73, positioned at the side of shaft 72, are fixed the curved links 74, one for each needle. Fixed upon the shaft 72 is a curved link 75. The links 74 and 75 are pivoted at their outer ends to the needle or wire feeding arm 76. The inner curved end of this arm 76 carries a pair of rollers or sheaves 77 between which the wire passes and by which it is held. Normally, the wire feeding arms are in the position shown in full lines, Fig. 7, with the wire passing over and between the sheaves 77 and then outward over a small sheave carried at the end of link 74.

When the connecting rod 70 is moved from its extreme left position, as shown in Fig. 2, to its extreme right position, the crank 71 is pulled forward and the links 74 and 75 swing inward toward the frame-work, and carry the pair of needles 76 through slits in the frame-work and across the baling chamber. The horizontal slits 21' in the plunger, as shown in Fig. 4, permit this movement of the wire feeding arms across the baling chamber, it being understood that the needles are advanced into the plunger while it is moving forward to complete its compression stroke. Fig. 7 shows in dotted lines the position which the needles 76 and their connecting links assume when at the end of their forward or wire feeding movement.

The wire twisting and cutting mechanism is arranged opposite to the wire feeding mechanism on the other side of the machine as is illustrated in Fig. 1. The wire twisting disks are shown in detail in Figs. 8 and 9 and reference will first be had to these figures. On the side of the frame-work are journaled two wire twisters, one for each wire feeding needle or arm. Each twister comprises a toothed disk portion 78 and a locking portion 79, the locking portion being shown in the drawings as rectangular in form. The hub portion 80 of the twister affords means for journaling the same in the frame-work. The twister is provided with a radial slot 81 which is narrowed toward its inner half to the width of one wire so that the wires cannot pass each other as the twister is rotated thereby insuring the opposite twist of the wire at both ends of the twister. The relative position of the twister on the frame-work is shown in Fig. 1. A double rack-bar 82 is adapted to reciprocate between the twisters and is so arranged that the teeth on the bar engage the teeth on the associated twisters. Normally, however, the twisters are locked by the engagement of their rectangular portions 79 with guide extensions 83 and 83' carried at the front and rear ends of the rack bar 82. A portion of the extension 83 is indicated diagrammatically in dotted lines in Fig. 9 underneath the locking portion 79. So long as the guide extensions 83 engage the locking portion 79 of the twisters as shown in Fig. 1 the twisters cannot be rotated. The teeth on the rack-bar 82 do not come into engagement with the twisters until these extensions have moved out of engagement with the locking portions of the twisters. Reciprocation of the rack-bar 82 is effected by a connecting rod 84 which is pivotally connected at a crank pin 85 to the crank disk 22. When, therefore, the crank disk 22 is operated by its clutch mechanism, the connecting rod 84 will actuate the rack-bar 82 either forwardly or backwardly to operate the twisters, the rack-bar making one complete twisting movement either forwardly or backwardly for each half turn of the crank disk 22.

The position and movements of the baling wires in the twisting and feeding mechanisms will now be explained. Referring to Fig. 1, two wire drums 86 and 87 are mounted upon the lower side member of the frame so as to rotate on horizontal axes turning freely thereon each independently of the other. This pair of drums is mounted on the same side as the wire twisting mechanism and toward the discharge end of the machine. Referring to Fig. 2, the wire drums 88 and 89 are mounted on separate horizontal axes so as to rotate freely and each independently of the other. This second pair of drums is mounted on the same side as the wire feeding mechanism and toward the delivery end of the machine. The wire passing from drum 88 is indicated by the reference numeral 90 and may be called the upper baling wire. The lower baling wire 91 extends across between the other drums 89 and 87.

The operation of the drums during the formation of the bale may be explained as follows: Each baling wire really consists of two wires tied together at their free ends while the other ends of the wires remain wound upon their respective drums. Thus the upper baling wire 90 is paid out simultaneously at both ends from the drums 86 and 88 as the baling increases in size. Similarly the lower baling wire 91 is paid out from the drums 87 and 89 simultaneously. This arrangement of a drum for each end of the baling wire accomplishes several important objects. In the first place, it gives to the wire a yieldable support at the side of the machine where the twisting mechanism is located, so as to cause the wire to be paid out in sufficient quantity during the twisting operation, for during that operation it is essential that a certain amount of wire be paid out in order to allow the twisting to take place properly. Without this yielding connection the wire is likely to break during the twisting. Another object accomplished by this arrangement of the wire drums is the automatic threading of the machine after each bale is complete. In first threading the machine, the ends of the wires from corresponding drums on opposite sides of the machine are threaded through the needle arms and twisted together leaving the wires stretched across the baling chamber. After this initial threading, the machine does its own threading automatically, that is to say after a bale has been formed and the cutting mechanism has severed the twisted wire (as will be more fully explained hereinafter) the wires are left stretched across the baling chamber just as they were when tied together after the initial threading. This automatic threading does away with waste of wire since the cutting mechanism severs each wire at a point between the two twists. One of these twists is on the wire around the bale while the other twist holds together the ends of the wires coming from the drums.

As the hay or other material is fed into the chamber and there compressed, the wires are paid out from the drums, and when the bale has reached its proper size the wires will extend longitudinally of the chamber at the sides of the bale. At this stage of the wire feeding, arms or needles 76 are thrust across the baling chamber through the slots in the forwardly moving plunger and carry the wires into the slots of the twister disks so as to form two closed loops of the wire around the bale. Then the twisting mechanism is set into motion through operation of its clutch released by the cam face 13 on the gear wheel 11 and the twisters are rotated as previously described to twist the wires. The result of this twisting operation is indicated in Fig. 9. It should be remembered that the feeding and twisting operations occur while the plunger is near or at the end of its compression stroke. In this way the bale is wired more securely than if the operations occurred while the plunger was removed from the bale for that would give the bale a chance to expand before the twisting had been completed.

The twister crank disk 22 makes but one-half revolution during each twisting operation, that movement of the disk being intermediate in time between two corresponding half revolutions of the opposing crank disk of the needle mechanism. During the first half revolution of the needle disk 23 the wire feeding arms or needle 76 are carried across the baling chamber through the slots in the plunger and over to the wire twisting disk. After this has taken place, the gear 11 is in such position that the extending arm 34 can drop down into the slot 14 thereby releasing the latch of the clutch and connects in the twister crank disk 22 with the continuously rotating shaft 25 (Fig. 18). This rotates the twister crank disk through an angle of 180 degrees thereby thrusting the rack 82 forwardly to operate the twisting disks and the cutting device. As the operation of the machine continues the rack-bar 82 remains in its forward position for by that time the opening 14 has moved past the arm 34 and the swinging clutch arms 31 and 32 have moved inward to engage the latch 28 thereby disconnecting the cam disk from its drive shaft. After the next bale has been formed and the needles have been advanced into twisting position, the twister clutch will again be thrown in and will effect another half revolution of the twister disk 22 thereby withdrawing the rack-bar 82 from its forward position to the position shown in Fig. 1. During this rearward movement the wire twisting disks are again operated to twist the baling wires.

The cutting device is operated by the rack-bar and severs the twisted wires at a point between the two twists which are made on opposite sides of each wire twisting disk as best shown in Fig. 9. In the form shown in the drawings the cutting device consists of a vertically movable knife 92 which coöperates with the face of the twisters to cut the wires. The knife is at its upper end connected with a bell-crank 93 by a slot and pin connection this bell crank being pivoted to the frame-work at 94 and at its other end carrying a lug 95 which is in the path of movement of stops 96 and 97 carried on a horizontal bar 98 mounted at the side of the twister rack, these stops 96 and 97 being adjustable along said bar to vary the timing of the cut. From this it will be clear that as the rack-bar approaches the limit of its forward movement the stop 97 strikes the lug 95 swinging the bell-crank 93 and shifting the knife 92 downwardly to sever the twisted wires. Fig. 15 shows the knife 92 in perspective and clearly shows the cutting notches 92$^a$ and 92$^b$. When the knife is moved downward at the end of the forward movement of the rack-bar 82 one set of notches will sever the twisted wires and on the next succeeding movement of the knife the other pair of cutting notches will operate. The cutting mechanism operates with equal facility in both directions and is reversed in direction whenever the operation of the twisting mechanism is reversed.

In order to hold the baling wires in proper position with respect to the twisters, guide pulleys 99 are provided opposite the knife and twisters as shown in Fig. 1, these pulleys being loosely mounted on the vertical shaft 100. To hold the wires in proper relation to the needles 76 sheaves 101 (Fig. 3) are fixed on the swinging links 74. The folding character of the needle carrying structure is such that on forward movement there is substantially enough slack in the wire to supply all the wire necessary for bridging the baling chamber. The needle movement may therefore be rapid and without danger of rupturing the wire through the inertia of the wire carrying spools. It is on the return movement of the needles that the greater part of the unwinding of new wire takes place. The return movement of the wire feeding needles takes place, as herebefore explained, after the twisting operation has been performed and is timed by the clutch mechanism at the other end of the machine working in conjunction with the cam flange 12 carried on the large gear wheel 10.

On the return movement of the plunger after the wire feeding and twisting operations have been accomplished the operating rod 38 is restored to its normal or raised position. It will be remembered that when the plunger begins its return movement after the bale has been completed the operating rod 38 is in the position indicated in dotted lines in Fig. 10. When the extension 66 on the plunger strikes the dog 59 the operating rod is raised because the dog is prevented from yielding rearwardly because of the stop 61. This lifting of the operating rod raises the projection 62 out of engagement with the locking pawl 63 while the supporting link 40 will be raised sufficiently to hook over the lug 42 (through the action of spring 40′) into position to support the weight of the operating rod 38. As soon as the locking engagement between the projection 62 and the pawl 63 is broken as above described the spring 38′ draws the operating rod 38 rearwardly to its original position. This rearward movement swings the bell cranks 36 of the clutch mechanism moving the links 35 upwardly and thereby releasing the pull on the arms 34 and allowing them to lift slightly out of engagement with their respective cam faces carried at the sides of the large wheels 10 and 11. This disconnects the feeding and twisting clutches and allows the machine to complete the construction of another bale while the needles and the twisters remain idle.

Positioned immediately in front of the forward end of the operating rod 38 is a pivotally mounted platform 102 having at its rear end a pivotal connection with a vertical link 103 which extends upwardly along side of the supporting link 40 and is pivoted to a swinging lever 104 mounted on the side of lug 42 and so positioned that it can lift a projecting finger vertically between the lug 42 and the projection 43 on link 40 thereby preventing engagement of the part 43 with the lug for such time as the platform 102 may be in its depressed or tilted position through pressure thereon of the forward curved end of the operating rod 38. It is the function of this group of elements to prevent latching at the lug 42 during the first return movement of the plunger which follows the release or dropping of the operating rod 38 when the bale has reached full size. In other words even though the lug 66 on its return movement may strike against the dog 59 and lift the operating rod 38 temporarily, there can be no engagement with lug 42 because of the intervention of the finger actuated from the rocking platform 102. The next forward movement of the plunger slides the front end of the operating rod 38 across the platform 102 and tilts it back to its initial horizontal position thereby pushing upward on link 103 and withdrawing the finger carried by lever 104 putting the parts in such relation that the next return movement of the plunger will lift the operating bar under such conditions that it can be retained in that raised position and can be pulled back by its main retraction spring 38′ into its initial or raised rearward position.

The packing lever used for packing the hay or other material in the baling chamber is best shown in Fig. 6. The packing lever 105 is angular in shape and carries a head 106 in position to swing down into the hopper 107 in advance of the forward movement of the plunger 21. The curved lever 105 is journaled in a pair of brackets 108 mounted on the top of the machine and has its lower end pivotally connected to a link 109, this link being pivoted to the plunger rod 20. When the plunger 21 is in its compressing position the packing lever is in a substantially upright position as indicated in full lines in Fig. 6, but during the return movement of the plunger, the lever is swung down to push the material through the hopper into the compression chamber and assumes the position indicated by dotted lines in Fig. 6.

An adjustable compressing device or press is mounted at the outlet end of the machine to govern the size of the delivery opening and thereby to govern the degree of compression in the bale. This press is shown somewhat diagrammatical in Fig. 21, and comprises tension bars 110 and 111 carrying the cross-piece 112 at the bottom, this piece fitting under the lower platform 113 and lower side rails 114 of the chamber through which the bales pass out. A similar cross-bar 115 receives the rods 110 and 111 through its ends and carries at its center an upstanding screw-threaded stud 116 provided with a handle 117 whereby the cross-piece 115 may be forced away from the cross-piece 118 to which rods 110 and 111 are anchored. This separation of the cross-pieces 115 and 118 serves to spring together the top and bottom of the bale chamber thereby narrowing the opening through which the bale must pass and so offering greater resistance to the plunger and thus effecting greater compression of the materials in the baling chamber. Side plates 119 are connected by suitable links 120 to the cross-pieces 112 and 115 so that the approach of these cross-pieces toward one another will simultaneously effect an inward movement of the members 119 thereby effecting compression at the sides of the bale simultaneously with compression in a vertical direction.

What I claim as new and desire to secure by Letters Patent of the United States is:

1. In a baling press, the combination of a wire feeding arm mounted to swing bodily across the baling chamber, said arm having a curved end portion with wire holding means, a pair of links pivotally connected with said arm, one of said links projecting beyond said arm and carrying a wire guiding roller, a wire reel support beyond said link and means for swinging said links to thrust said wire carrying arm into the baling chamber and to withdraw said arm while simultaneously unwinding wire from said reel.

2. In a baling press, the combination of a vertical rock shaft, a crank arm connected to said shaft, means for swinging said crank arm, a curved link mounted to swing with said rock shaft, a second curved link pivotally mounted at the side of said first named link and having a wire carrier at its free end and a swinging wire carrying arm pivoted to the free ends of said links and having rollers for supporting and holding a baling wire, and a support for a reel to supply wire to said wire supporting arm, said reel being positioned behind said swinging links so that when the links swing forward to advance the wire carrying arm across the baling chamber, there will be slack in the bailing wire and relatively little unwinding from the reel while on the return movement the outward swing of the links will unwind wire from the reel.

3. In a baling press, the combination of a wire feeding arm having a curved inner end, a pair of rollers carried by said curved end for receiving the baling wire between them, a pair of links pivoted to said wire feeding arm and pivotally mounted to the frame work of the press, a roller mounted near the outer end of the wire feeding arm, wire supplying means located behind said links and actuating means connecting said links to advance the wire feeding arm across the bailing chamber of the press and to unwind wire from the wire supplying means on the return swing.

4. In a baling press, the combination of a frame work, a rotatable wire drum carried on either side of said frame work, wires leading rearwardly from both of said drums and extending across the baling chamber where they are twisted together, both of said drums simultaneously paying out the wire as the bale increases in size, wire twisting mechanism, collapsible wire feeding mechanism pivoted to the supporting means and adapted to swing across the baling chamber to the twisting mechanism while simultaneously collapsing and without unreeling more than a small quantity of wire from either of the drums, and means for cutting the wire after the twisting mechanism has operated.

5. In a baling press, the combination of a frame-work, a rotatable wire drum on each side of said frame work and both positioned toward the front end thereof, wires leading from said drums across the baling chamber and there twisted together, both of said drums being arranged to pay out the wire as the bale increases in size, wire twisting mechanism on one side of the frame-work, a wire feeding arm positioned to advance across the baling chamber when the bale is of full size to bring the binding wire into engagement with the twisting mechanism, pivoted links for supporting and driving said arm and means for cutting the twisted wire before the wire carrying mechanism returns to its initial position.

6. In a baling press, the combination of a frame-work, a wire drum on either side of the frame work and arranged approximately opposite one another on the same end of the frame work, the wires from said drums being connected together at their ends and extending across the baling chamber, said drums being arranged to pay out the wire as the bale increases in size, wire twisting mechanism on one side of the machine, wire feeding mechanism on the other side of the machine, the said wire feeding mechanism comprising a wire carrying arm and a plurality of links adapted to collapse when the wire is advanced across the baling chamber, this collapsing of the wire feeding mechanism serving to give enough slack to the wire to prevent danger of breakage through inertia of the wire reel; and means on the twister's side of the machine for cutting the wire after it has been twisted so that on the return movement of the wire carrying mechanism, the wire will be again stretched across the baling chamber.

7. In a baling press, a fixed support on each side of the baling chamber, a baling wire arranged to stretch across the baling chamber and a pair of rotatable drums, one on either side of the support and both located at the same end thereof, twister mechanism on one side of the machine and wire advancing mechanism on the other side of the machine, said wire advancing mechanism comprising arms and links and being collapsible in character to provide enough slack wire for the rapid advance across the baling chamber without any considerable unwinding of wire at the wire drums.

8. In a baling press, the combination of a plurality of wire twisting members, a wire cutting knife positioned adjacent to said twisters, a rack for operating said twisting members in alternately reverse directions for twisting the wires of successive bales, a bell crank for shifting said wire cutting knife and stops positioned near the front and rear ends of said rack for striking said bell crank to shift the wire cutting knife after each forward or backward movement of the twisting members.

9. In a baling press, the combination of a plurality of wire twisting members, a rack for operating said members, a wire cutting knife positioned adjacent to said members, a pair of stops positioned at the side of said rack and means connected with said knife and lying in the path of said stops to shift said knife and cut the wire after each forward or backward movement of the rack.

10. In a baling press, the combination of a plurality of wire twisting members, a sliding knife movable close to said members for cutting the wire, a bar positioned at the side of said rack and carrying a pair of adjustable stops, one near the front of the rack and the other near the rear of the rack, and a lever connected with said knife and having one end positioned for impact with said stops whereby said sliding knife is moved each time said rack moves either forwardly or rearwardly.

11. In a baling press, the combination of a sliding wire-cutting knife having a plurality of openings for each baling wire, a bell crank connected with said knife, a reciprocable member at the side of the press and stops carried by said member and movable into contact with said bell crank to shift the position of said knife at each forward or rearward movement of said reciprocable member.

12. In a baling press, the combination of a pair of vertically rotatable wire twisting disks provided with teeth, a rack bar adapted to reciprocate between said disks, the upper and lower edges of said rack bar being provided with teeth which mesh with the teeth on the disks, a cutting knife slidingly mounted adjacent to said disks, means for actuating said rack bar in one direction to cause twisting of the wires for one bale and actuating it in the other direction to cause twisting of the wires for the next bale, stops positioned near the front and rear ends of said rack bar and means connected with said knife and positioned for impact with said stops to shift said knife at each forward or rearward movement of the reciprocating rack bar.

13. In a baling press having wire twisting mechanism, wire feeding mechanism and a reciprocable plunger, the combination of a continuously rotating power shaft, cross arms fixed upon said shaft, a crank disk loosely mounted on either end of said shaft, one of said disks being connected to actuate the twisting mechanism and the other disk being connected to actuate the wire feeding mechanism, a latch member for each of said disks movable into the path of said cross arms to establish driving connections between said shaft and the respective disks and means controlled from the baling chamber for actuating said latches to establish the driving connection with the wire feeding mechanism and the wire twisting mechanism at the proper time intervals.

14. In a baling press having wire twisting mechanism and wire feeding mechanism and a reciprocable plunger, a continuously rotating power shaft, a crank disk at either end of said shaft, one of said disks being operatively connected to actuate said twisting mechanism and the other of said disks being operatively connected to actuate the wire feeding mechanism, cross arms carried by said continuously rotating shaft, swinging latches pivotally mounted on each of said crank disks in position for establishing driving connection between said cross arms and said disks, swinging arms movable in unison to control the movement of each of said latches, an extending arm directly connected with one of said swinging arms, a cam face with which said arm may be placed in engagement and operative means controlled by the size of the bale for swinging said extending arms into engagement with their respective cam surfaces when the twisting and wire feeding mechanisms are to be operated.

15. In a baling press having wire twisting mechanism, wire feeding mechanism and a reciprocable plunger, the combination of a continuously rotating power shaft, a crank disk loosely mounted on one end of said shaft for actuating the twisting mechanism, a crank disk loosely mounted on the other end of said shaft for actuating the wire feeding mechanism, a swinging latch for each of said disks, swinging arms for each latch positioned to control the movements of the latch, a cross arm for each crank disk, said cross arm being carried by the power shaft in position for establishing driving connection with the crank disk when the latch swings outward, a power driven gear on either side of the machine, each of said gears carrying a cam face, and an arm for each of said cam faces which can be swung into engagement therewith when a bale is complete, each of said arms being rigidly connected with one of the swinging arms used to control each latch.

16. In a baling press, the combination of a continuously rotating power shaft, a cross arm fixed thereto and carrying rollers at either end, a crank disk loosely mounted on said shaft and carrying a pivotally supported latch, said latch being movable into the path of said rollers to establish driving connection between said shaft and said disk, a pair of swinging arms for controlling the action of said latch, said arms having extensions connected with a slot and pin connection to insure movement in unison, an extending arm rigidly connected with one of said swinging arms, a cam face and means for bringing said extending arm into bearing relation with said cam face.

17. In a baling press, the combination of a continuously rotating power shaft, a cross arm fixed to said shaft and carrying a roller at either end, a crank disk opposite said cross arm, a swinging latch positioned to establish driving connection between said rollers and said crank disk and a pair of swinging arms positioned for engagement with said disk to control said driving connection, said swinging arms having extensions with a slot and pin connection to insure simultaneous movement, a rotating cam face having an opening, an extending arm rigidly connected with one of said swinging arms and arranged to contact with said cam face and yielding means for swinging said arm into contact with said face when a driving connection is to be established by movement of said latch.

18. In a baling press having wire twisting mechanism and a reciprocable plunger, a rod operatively connected for working said wire twisting mechanism, a crank disk connected to drive said rod, a power shaft normally in operation, connections between said crank disk and said power shaft, a gear wheel having a projecting cam face cut away at a predetermined point, an arm movable into contact with said cam face, and a pair of swinging arms having a slot and pin connection to insure uniform movement, said arms being operatively connected to swing when said first named arm reaches the cut away portion of said cam face, and means actuated by said swinging arms for establishing driving connection between said power shaft and said crank disk.

19. In a baling press having wire twisting mechanism, wire feeding mechanism and a reciprocable plunger, the combination of a continuously rotating shaft, a clutch at either end of said shaft for controlling relatively the movements of said wire twisting mechanism and wire feeding mechanism, a pair of large gear wheels having a cross pin operatively connected to move said plunger, said wheels having side flanges forming cam faces, a control rod at the side of the press operative in accordance with the size of the bale, projecting arms contacting respectively with the cam faces carried by said gear wheels, lever and link connections between said control rod and said projecting arms, and means controlled by movement of said projecting arms with respect to said cam faces for establishing driving connection, first to said wire feeding mechanism, then to said wire twisting mechanism and then to said wire feeding mechanism to complete the wiring of a bale within the press.

20. In a baling press having wire feeding mechanism, wire twisting mechanism and a reciprocable plunger, the combination of a power shaft, means for intermittently establishing driving connection between said power shaft and said twisting and wire feeding mechanisms, a control rod at the side of said press, a supporting link for the forward end of said control rod, a lug by which said link may be supported, means for pushing said link from its supporting lug when the bale has reached full size and means for preventing reëngagement of said link with said lug during the next return movement of said reciprocable plunger.

21. In a baling press having wire twisting mechanism, wire feeding mechanism, a reciprocable plunger and mechanism for throwing the wire twisting and wire feeding mechanisms into operation when the bale has attained full size, the combination of a control rod for the wire feeding and wire twisting mechanisms, the forward free end of said rod being supported from a lug by a vertical link, means for pushing said link out of engagement with said lug when the bale has attained full size, and means governed by the fall of said control rod for interposing a barrier between said link and said lug to prevent reëngagement on the next return movement of the reciprocable plunger.

22. In a baling press, the combination of a control rod, a reciprocable plunger, a lug projecting from said plunger for engagement with said control rod after the latter has been dropped, means for supporting said control rod while the bale is forming, means for dropping said control rod when the bale is of full size, and means actuated by said control rod when it drops for preventing the return of said control rod to its supported relation when said plunger returns from its compression stroke.

23. In a baling press having a reciprocable plunger and wire twisting and wire feeding mechanisms governed by a control rod, the combination of a link supporting said control rod out of operative engagement with said plunger, means for pushing said link from its support when the bale has attained full size, a platform against which said control rod strikes when it is dropped from its supported position and a finger controlled by the movement of said platform and operative as a barrier to prevent reëngagement of said link with its supporting lug during the next return movement of said reciprocable plunger.

In witness whereof, I hereunto subscribe my name to this specification in the presence of two witnesses.

GEORGE E. JACKSON.

Witnesses:
JOSEPH JACKSON,
E. J. JOHNSON.